(12) United States Patent
Cornfield

(10) Patent No.: US 7,088,642 B2
(45) Date of Patent: Aug. 8, 2006

(54) COOKING APPLIANCE WITH REMOVABLE TIMER

(76) Inventor: Randall Cornfield, 5499 Robert Burns #306, Montreal, Quebec (CA) 4W-2B4

( * ) Notice: Subject to any disclaimer, the term of this patent is extended or adjusted under 35 U.S.C. 154(b) by 252 days.

(21) Appl. No.: 10/156,698

(22) Filed: May 28, 2002

(65) Prior Publication Data

US 2003/0223312 A1 Dec. 4, 2003

(51) Int. Cl.
*G04B 47/00* (2006.01)
(52) U.S. Cl. .............................. 368/10; 368/98; 99/344
(58) Field of Classification Search ............... 368/10, 368/97–100, 107–109; 99/342–344, 403
See application file for complete search history.

(56) References Cited

U.S. PATENT DOCUMENTS

| | | | |
|---|---|---|---|
| 578,059 A * | 3/1897 | Hallas | 368/100 |
| 2,192,600 A | 3/1940 | Lurtz | |
| 3,738,354 A | 6/1973 | Aries et al. | |
| 4,257,394 A | 3/1981 | Zabel | |
| 4,313,371 A | 2/1982 | Jackson et al. | |
| 4,451,156 A * | 5/1984 | Kloppsteck | 368/10 |
| D295,817 S | 5/1988 | Sebillotte | |
| 4,805,188 A * | 2/1989 | Parker | 374/141 |
| 5,088,069 A | 2/1992 | Koziol | |
| 5,265,522 A | 11/1993 | Schultz | |
| D360,335 S | 7/1995 | Chang | |
| 5,644,552 A * | 7/1997 | Lien | 368/10 |
| D382,767 S | 8/1997 | Lien | |
| 6,360,654 B1 | 3/2002 | Cornfield | |
| 6,615,706 B1 * | 9/2003 | Wu | 99/331 |

FOREIGN PATENT DOCUMENTS

| | | |
|---|---|---|
| FR | 2664148 | 1/1992 |
| JP | 04135785 | 11/1993 |
| JP | 09262618 | 3/1994 |
| JP | 04308025 | 5/1994 |

OTHER PUBLICATIONS

THANE, www.thane.com/html/products/hf/orbitrekplat/orbitrek.html, printed on Apr. 21, 2005.*

* cited by examiner

*Primary Examiner*—Kamand Cuneo
*Assistant Examiner*—Thanh S. Phan

(57) ABSTRACT

A cooking appliance has a timer removably attached to the cooking appliance by a dove-tail joint. The cooking appliance has a lid with a lid handle located on a top of the lid. The lid handle has a first portion of the dove-tail joint and the timer has a second portion of the dove-tail joint. The timer is removably attachable to the cooking appliance by aligning and engaging the first portion of the dove-tail joint of the timer with the second portion of the dove-tail joint of the lid handle. The display and controls are located on a top of the timer. A bottom portion of the timer includes the second portion of the dove-tail joint, and the bottom portion of the timer has a substantially planar bottom surface forming a stable base for the timer when the timer is in a detached state. The bottom portion of the timer extends below the controls of the timer to provide stability for the timer when the timer is operated in the detached state. A projection in one portion of the dove-tail joint engages a recess in the other portion of the dove-tail joint to releasably secure the time to the cooking appliance when in an attached state.

8 Claims, 6 Drawing Sheets

UTILITY

UTILITY (DOVETAIL)

COOKING APPLIANCE WITH REMOVABLE TIMER

FIELD OF THE INVENTION

The invention pertains to the field of cooking appliances, and in particular to cooking appliances.

BACKGROUND AND SUMMARY OF THE INVENTION

An important factor in cooking is the time for which a food item is exposed to heat as well as the timing required for the various stages of the cooking process. During cooking, it is often difficult for a cook to accurately determine or keep track of the amount of time that a food item has been exposed to heat. Moreover, a cook often prepares several food items at one time, each of which may require a different cooking time.

It is common for cooks to use clocks or countdown timers to more precisely gauge the cooking time of a food items. For example, a cook may use one more timers to monitor the cooking time of several food items and may place the timers on a counter adjacent the cooking appliance or appliances. However, prior art cooking timers are typically independent of the cooking appliance and the cook may have difficultly in remembering which timer is set for which cooking appliance. Moreover, the user may have a difficult time in finding a safe place to locate the timer, especially in confined and/or particularly active cooking environments.

In other circumstances, a cook may wish to temporarily leave the area of the cooking appliance, such as when a cooking time is particularly long. In addition, cooking appliances typically must be cleaned after use. Therefore there is a need for a cooking appliance having a timer that may be easily and conveniently associated with the cooking appliance for which it is set, especially when several cooking appliances and timers are being used, which timer can be separated from the cooking appliance for transport to another location and for cleaning of the cooking appliance.

The present invention overcomes the drawbacks of prior art cooking timers and satisfies the above desires. The cooking appliance of the present invention includes a timer which can be securely attached to the cooking appliance in an easy and convenient manner and which can be removed and transported by the cook to another location, or for cleaning the cooking appliance.

In a preferred embodiment, the cooking appliance includes a lid having a handle with a socket for secure, removable attachment of a cooking timer. The timer includes a display, such as a mechanical timer or a digital timer with an Liquid Crystal Display (LCD), and control settings preferably on an upwardly-facing top surface of the timer. Preferably, the handle (and timer attached thereto) is located at a top of the lid such that the timer is located at a highest point of the cooking appliance to provide a clear and unobstructed view of the timer. Further, the lid and/or the handle thereof preferably rotates relative to a bottom of the cooking appliance to permit the cook to align the timer for optimal viewing and control.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF A PREFERRED EMBODIMENT

Figure 1:
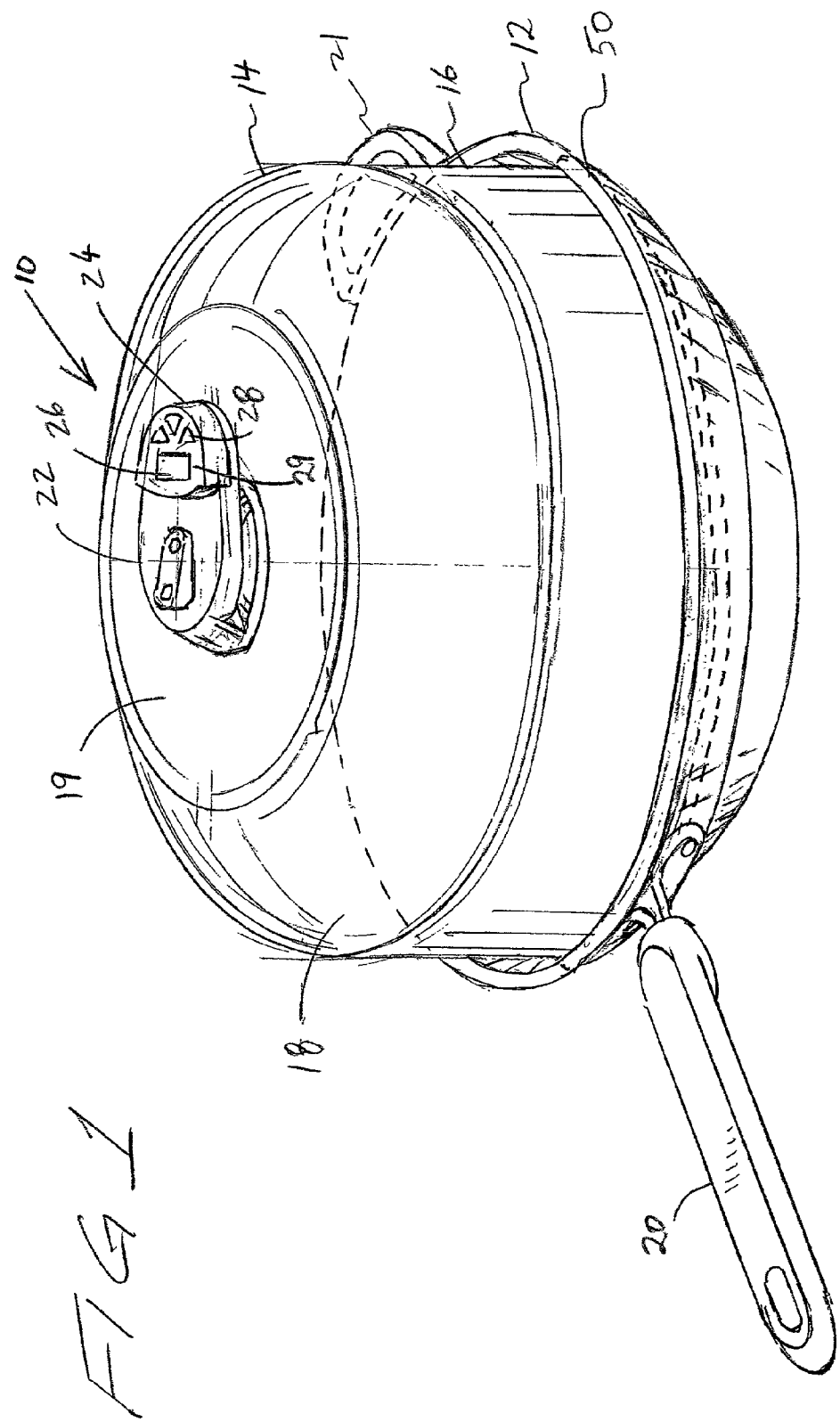
FIG. 1 is a perspective view of a preferred embodiment a cooking appliance constructed according to the intention.

Referring to FIG. 1, a preferred embodiment of a cooking appliance 10 constructed according to the invention includes a bottom vessel 12 for retaining food items and liquid and a lid 14, which is preferably a dome lid having a substantially cylindrical side wall 16 and a partially spherical roof 18 with a planar top portion 19. However, other shape lids are also within the scope of the invention. The bottom vessel 12 includes a bottom handle 20 for transporting the cooking appliance 10. The lid 14 includes a lid handle 22, suitable for grasping by a user to place and remove the lid 14. Preferably, the lid handle 22 and bottom handle 20 are formed of heat-resistant plastic, or other heat resistant, insulating material to protect the user from the heat of the cooking appliance during use.

The lid handle 22 is preferably located at top center of the lid 14 and is preferably located at a highest portion of the lid 14. A timer 24 is removably attachable to the lid handle 22. Preferably, the timer 24 is digital or electronic type timer and includes a Liquid Crystal Display (LCD) 26 and controls 28 (such as depressible or touch-sensitive buttons) suitable to set, start, step and otherwise control the timer on a top 29 of the timer 24. The timer 24 also preferably includes a light and/or sonorous signal means (not shown). The timer 24 preferably includes an integrated digital clock and timing and control circuitry connected to the LCD display 26, controls 28 and signal means. The timer 24 also preferably includes a self-contained power source connected to the circuitry, such as a replaceable or rechargeable battery. Alternatively, as can be appreciated, the timer 24 can be of an analog or mechanical type.

Figure 2:
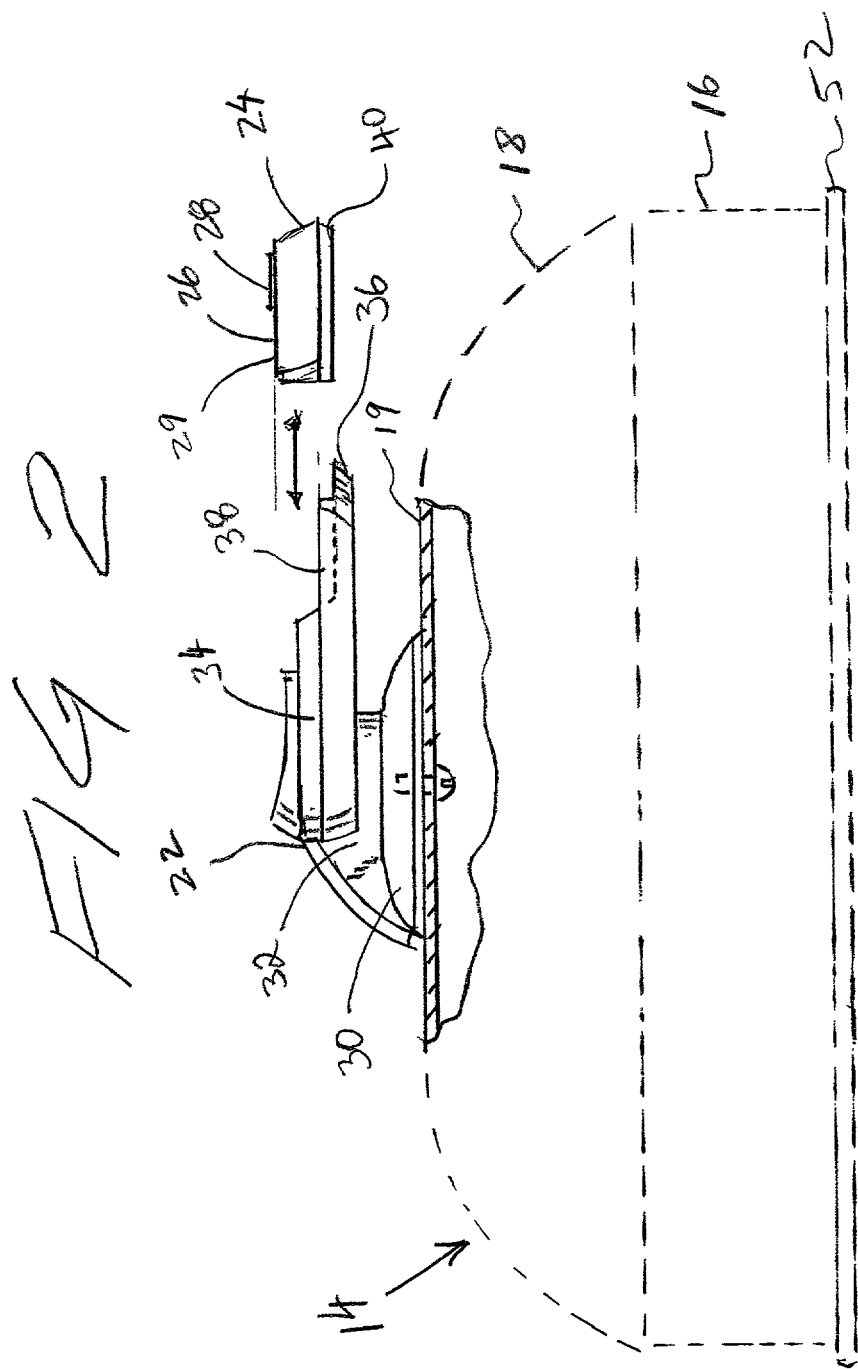
FIG. 2 is side elevation view of a top of the lid and timer of the cooking appliance of FIG. 1.
Figure 3:
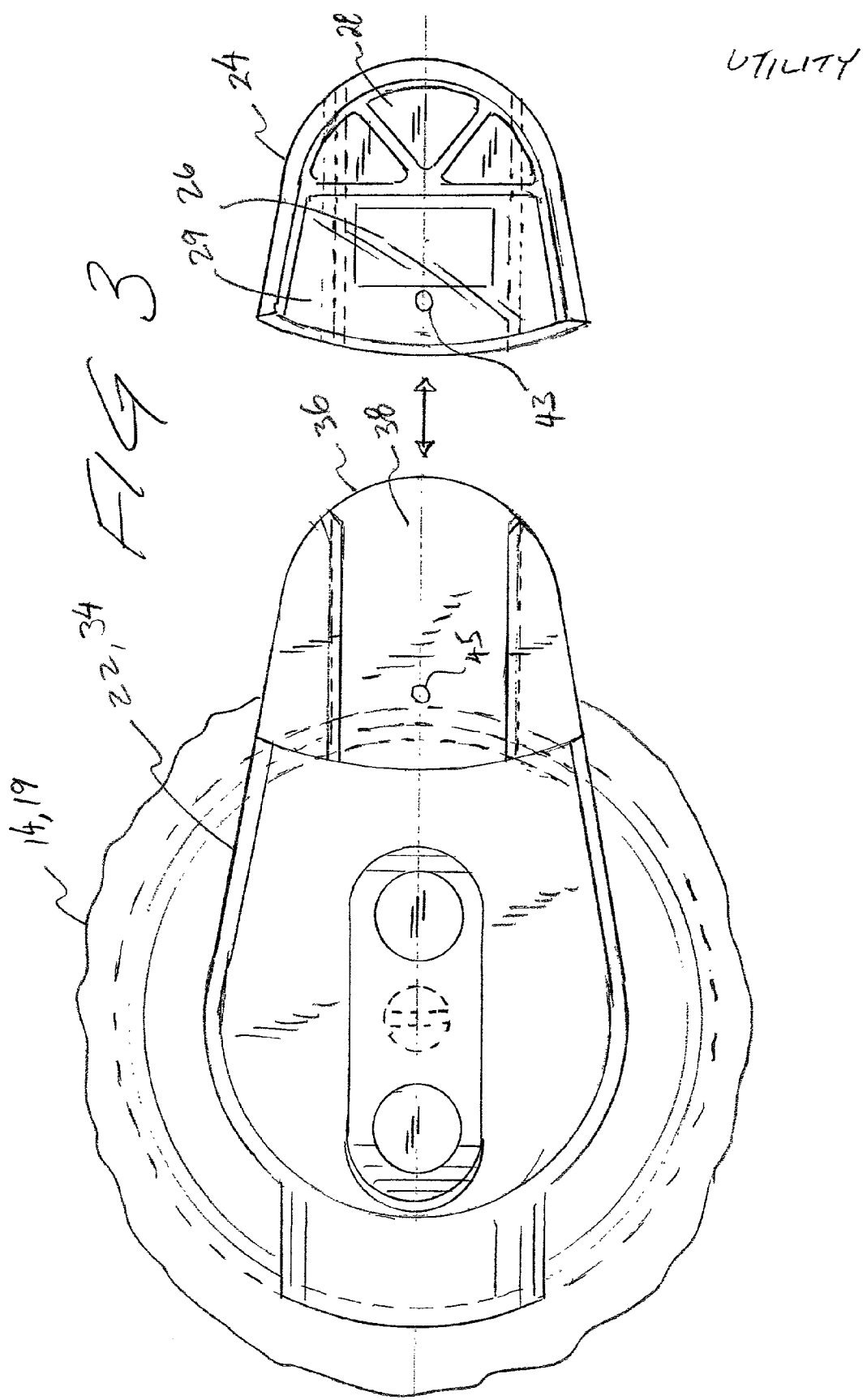
FIG. 3 is a cut-away top plan view of handle and timer of the cooking appliance of FIG. 1.
Figure 4:
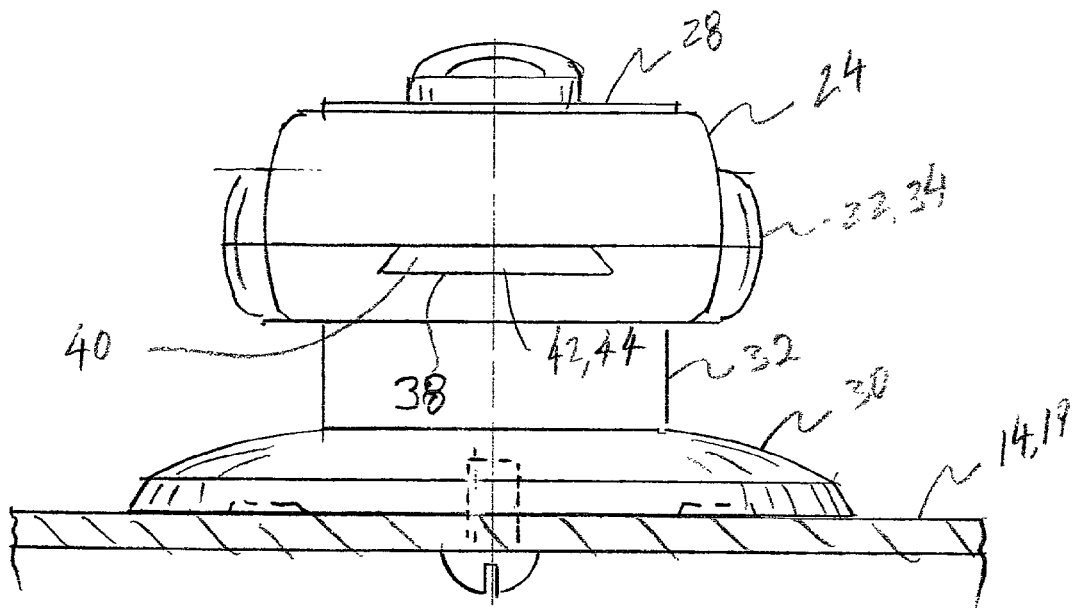
FIG. 4 is a cut-away end elevation view of the handle and timer of the cooking appliance of FIG. 1.

Referring to FIGS. 2–4, the lid handle 22 preferably includes a circular base 30 in contact with the lid 14, a neck portion 32 extending upwardly from the circular base 30, and a grasping portion 34 depending from the neck portion 32. The grasping portion 34 preferably extends laterally outwardly from the neck portion 32 to facilitate secure grasping of the lid handle 22.

The grasping portion 34 includes a cantilevered end portion 36 having a socket 38 sized and shaped to removeably and securely receive an engaging portion 40 on a bottom of the timer 24. Preferably, the socket 38 is in the form of a female portion of a dove-tail joint aligned horizontally with respect to the lid 14, and the engaging portion 40 is in the form of a complementary male portion of a dove-tail joint on the bottom 42 of the timer 24. It can be appreciated that the orientation of the portions of the dove-tail joint can be reversed such that the female portion is disposed on the timer 24 and the male portion is disposed on the lid handle 22.

As best depicted in FIG. 2, the timer 24 can be securely attached to the lid 14 by aligning the engaging portion 40 of the timer 24 with the socket 38 of the lid handle 22 and sliding the engaging portion 40 of the timer 24 into the complementary socket 38 of the lid handle 22. Thus, the timer 24 can be grasped by one hand of the user and attached to the cover 14 of the cooking appliance 10 with a simple, linear lateral (i.e., horizontal) motion. Indeed, it is intended that the timer 24 can be attached to the cover 14 of the cooking appliance 10 with only one hand of the user.

As shown in FIG. 3, the engaging portion 40 of the timer 24 preferably includes a recess 43 sized and shaped to receive a projection 45 in the socket 38 of the lid handle 22 to retain the timer 24 on the lid handle 22 when attached. Thus, when attached to the lid handle 22, the timer 24 is securely affixed to the lid 14 of the cooking device.

The bottom vessel 12 preferably includes a retaining rim 50 around a periphery which surrounds a bottom rim 52 of the lid 14 to provide lateral stability to the lid 14 when placed on the vessel 12. Therefore, the lid 14 will remain on top of the vessel if an amount of force is applied laterally (i.e. horizontally) to the lid 14 when the timer 24 is attached or removed. If required, the user may grasp the bottom handle 20 to secure the cooking appliance 10 during attachment and removal of the timer 24. As stated above, preferably the bottom handle 20 and lid handle 22 are formed of insulating material such that the user may comfortably grasp both portions while the cooking appliance is heated.

The timer 24 is removed from the lid handle 22 in an opposite motion, to transport the timer 24 to another location, to carry the timer 24 separate from the cooking appliance 10, or to clean the cooking appliance 10. Again, the timer 24 can be removed with one hand in a simple, linear motion.

Preferably, a bottom surface 44 of the engaging portion 40 of the timer 24 is substantially planar such that, if the timer 24 is removed from the lid 14 and is placed on a countertop or other flat surface, the bottom surface 44 of the engaging potion 42 forms a stable base for the timer 24. Further, when so placed, the engaging portion 40 of the timer 24 is preferably located below the controls 28, such that the timer 24 will remain stable (i.e., will not tip) when the controls 28 are depressed to operate the timer 24.

A magnet (not shown) can be contained within the engaging portion 40 of the timer 24 for mounting the timer 24 to a metallic surface, such as a refrigerator door, when disconnected from the cooking appliance 10. Preferably the magnet is mounted flush with a bottom surface 44 of the engaging portion 40 of the timer 24.

When attached to the lid handle 22, the LCD display 26 and controls 28 face upwardly toward the user to provide a clear, unobstructed view of the display and controls. Further, the lid 14 and/or lid handle 22 preferably rotates relative to the bottom vessel 12 such that the user can align the timer for optimal viewing and control. While placement of the timer 24 on the lid handle 22 is depicted in the preferred embodiment, it is intended that the timer 24 can be affixed to other locations of the cooking appliance 10. For example, the bottom handle 20 can include a socket (not shown) sized and shaped according to the socket 38 of the lid handle 22 described above for attachment of the timer (or vice versa). Alternatively, the timer 24 can be located on the opposed gripping portion 21 of the vessel 12. It can be appreciated that other locations of the socket and timer are also within the scope of the invention.

Therefore the present invention provides a cooking appliance with a timer that may be easily and conveniently attached and removed from the cooking appliance such that the timer can remain associated with the cooking appliance for which it is set and can be separated from the cooking appliance for transport to another location or for cleaning.

Figure 5:
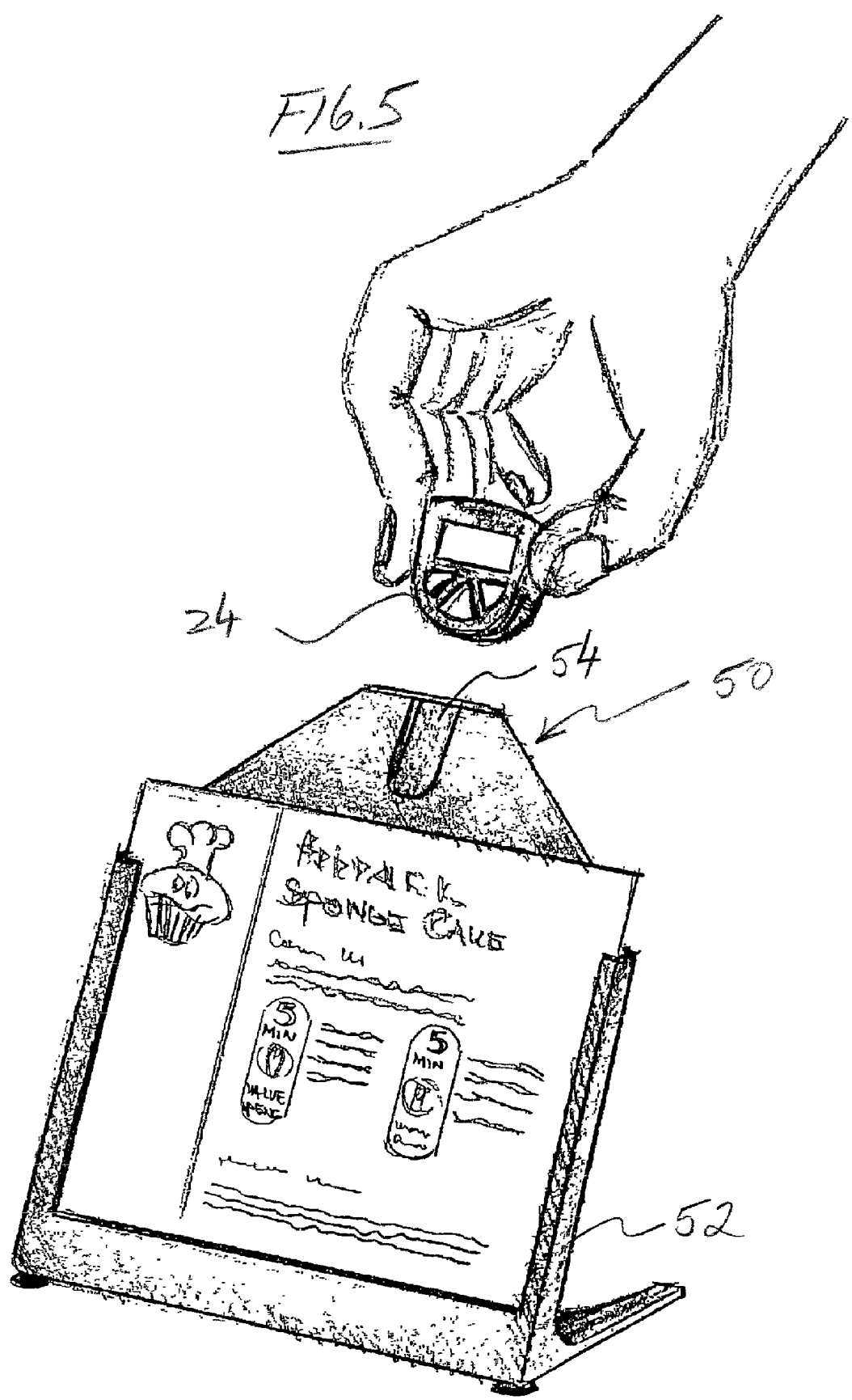
FIGS. 5 & 6 are perspective views of independent bases of the invention.
Figure 6:
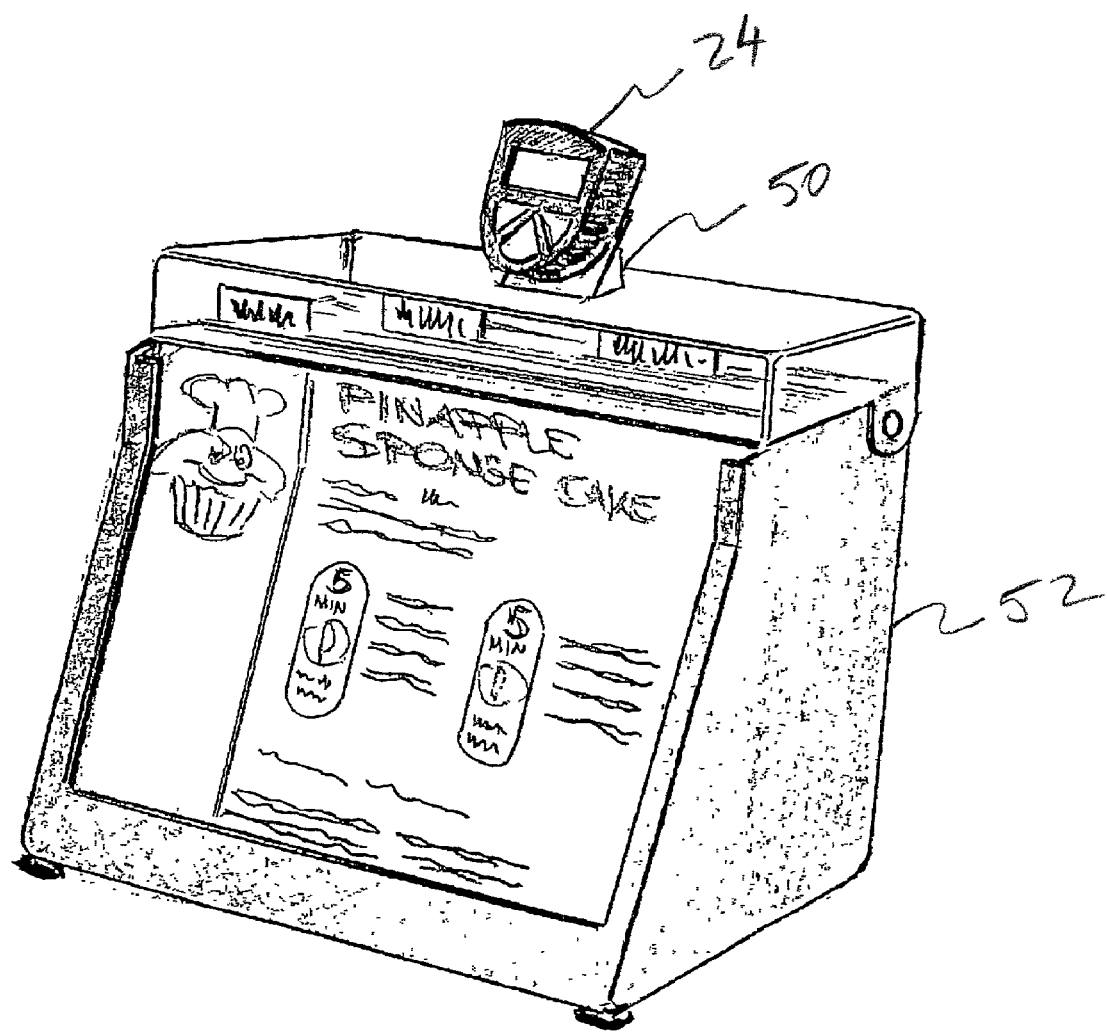

Referring to FIGS. 5 & 6, the cooking appliance 10 of the present invention can also include an independent timer support 60 which is separable from the vessel 12 and lid 14 of the cooking appliance 10 for securely and visibly supporting the timer 24 when disconnected from the cooking appliance 10. As depicted, the independent support 60 can be integrally formed with a recipe holder (FIG. 5) or a recipe box (FIG. 6), or another type of item. Preferably, the timer support 60 includes a base 62 in contact with a support surface and includes a socket 64 that is complementary to the engaging portion 40 of the timer 24 such that the timer may be securely removably mounted to the timer support.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A cooking appliance, comprising:
   a vessel;
   a lid supportable by said vessel, said lid being substantially laterally confined when supported by said vessel;
   a timer having a display and controls; and
   attachment means for removably attaching said timer to said lid, said attachment means including a cooperating tongue and groove arrangement between said timer and said lid for allowing slidable engagement therebetween;
   said timer being slidably attached to and removed from said lid.

2. A cooking appliance as in claim 1, wherein said vessel has a rim operable to maintain lateral confinement of said lid during attachment and removal of said timer from said lid.

3. A cooking appliance as in claim 1, wherein:
   said cooking appliance includes a lid having a lid handle located on a top of said lid;
   said lid handle includes a first portion of a dove-tail joint;
   said timer includes a second portion of said dove-tail joint; and
   said timer is removably attachable to said cooking appliance by engaging said first portion of said dove-tail joint of said timer with said second portion of said dove-tail joint of said lid handle.

4. A cooking appliance as in claim 3, wherein:
   said display and controls are located on a top of said timer;
   a bottom portion of said timer includes said second portion of said dove-tail joint; and
   said bottom portion of said timer has a substantially planar bottom surface forming a stable base for said timer when said timer is in a detached state.

5. A cooking appliance as in claim 4, wherein said bottom portion of said timer extends below said controls of said timer to provide stability for said timer when said timer is operated in said detached state.

6. A cooking appliance as in claim 3, further comprising:
   a projection on a first portion of said dove-tail joint and a recess on a second portion of said dove-tail joint; and
   said recess being sized and shaped to removably retain said projection.

7. A timer as recited in claim 1 wherein is operable independently of said lid when both attached to and removed from said lid.

8. A cooking appliance, comprising a timer and means to removably attach said timer to said cooking appliance including a dove-tail joint, said timer is removably attachable to said cooking appliance by slidably engaging a first portion of said dove-tail joint with a second portion of said dove-tail joint in a linear lateral motion.

* * * * *